United States Patent
Hamada et al.

(10) Patent No.: US 11,441,952 B2
(45) Date of Patent: Sep. 13, 2022

(54) INFRARED TEMPERATURE SENSOR AND METHOD OF MANUFACTURING THE SAME

(71) Applicant: SHIBAURA ELECTRONICS CO., LTD., Saitama (JP)

(72) Inventors: Morihisa Hamada, Saitama (JP); Tatsuya Konno, Saitama (JP); Yuko Higuchi, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 1074 days.

(21) Appl. No.: 16/075,863

(22) PCT Filed: Jun. 6, 2017

(86) PCT No.: PCT/JP2017/020923
§ 371 (c)(1),
(2) Date: Aug. 6, 2018

(87) PCT Pub. No.: WO2018/225141
PCT Pub. Date: Dec. 13, 2018

(65) Prior Publication Data
US 2021/0003455 A1   Jan. 7, 2021

(51) Int. Cl.
*G01J 5/20* (2006.01)
*G01J 5/04* (2006.01)
(Continued)

(52) U.S. Cl.
CPC . *G01J 5/20* (2013.01); *G01J 5/04* (2013.01); *G01J 5/041* (2013.01); *G01J 5/046* (2013.01);
(Continued)

(58) Field of Classification Search
CPC ...... G01J 5/20; G01J 5/04; G01J 5/046; G01J 5/064; G01J 2005/0092; G01J 5/06; G01J 5/10; G01J 5/485; G01J 5/041; G01J 5/70
See application file for complete search history.

(56) References Cited

U.S. PATENT DOCUMENTS 9,163,999 B2 * 10/2015 Kubota ................ G01J 5/0853
10,107,689 B2 * 10/2018 Nojiri ....................... G01J 5/04
(Continued)

FOREIGN PATENT DOCUMENTS

JP    2002-156284 A    5/2002
JP    2006-118993 A    5/2006
(Continued)

*Primary Examiner* — Christine S. Kim
(74) *Attorney, Agent, or Firm* — Pearne & Gordon LLP

(57) ABSTRACT

An infrared temperature sensor that detects temperature of a detection object in a non-contact manner includes a sensor case that includes a light guiding region and a light shielded region, a film that absorbs and converts infrared rays into heat, a sensor cover, an infrared detection element, and a temperature compensation element. The sensor case includes a case base portion and a hood that surrounds the light guiding region and the light shielded region and is erected from the case base portion. The hood includes an opening part and a shielding part that protrudes toward an inside of the hood while defining the opening part and the light guiding region, and shields the light shielded region from the infrared rays. A protrusion direction of the shielding part toward the inside of the hood is adjustable.

10 Claims, 9 Drawing Sheets

(51) Int. Cl.
  *G01J 5/06* (2022.01)
  *G01J 5/00* (2022.01)
(52) U.S. Cl.
  CPC ............. *G01J 5/06* (2013.01); *G01J 5/064* (2022.01); *G01J 2005/0092* (2013.01)

(56) References Cited

U.S. PATENT DOCUMENTS

| | | | |
|---|---|---|---|
| 2003/0123517 A1* | 7/2003 | Nojiri | G01J 5/041 |
| | | | 374/208 |
| 2007/0065165 A1* | 3/2007 | Mashiba | G03G 15/2039 |
| | | | 399/33 |
| 2014/0140712 A1 | 5/2014 | Nakayama et al. | |
| 2019/0049308 A1* | 2/2019 | Hirano | G01J 5/08 |

FOREIGN PATENT DOCUMENTS

| | | | |
|---|---|---|---|
| JP | 2012-237571 A | 12/2012 | |
| JP | 5207329 B1 | 3/2013 | |
| JP | 2014-089108 A | 5/2014 | |
| JP | 2015-172537 A | 10/2015 | |
| JP | 2015172537 A | * 10/2015 | |

* cited by examiner

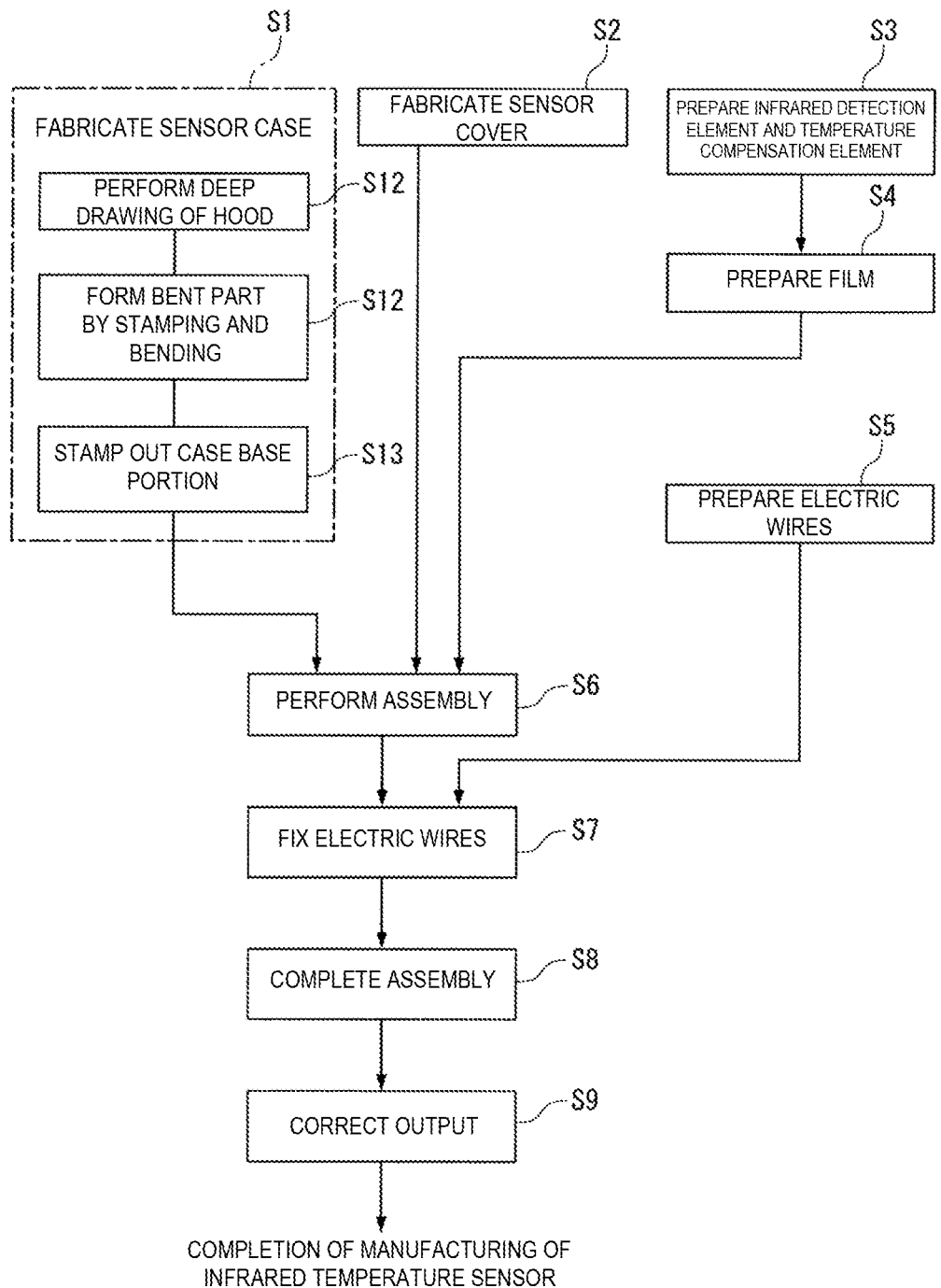

EMBODIMENT

COMPARATIVE EXAMPLE

INFRARED TEMPERATURE SENSOR AND METHOD OF MANUFACTURING THE SAME

CROSS-REFERENCE TO RELATED APPLICATIONS

This is a National Stage application of PCT international application PCT/JP2017/020923, filed on Jun. 6, 2017, which is incorporated herein by reference in its entirety.

TECHNICAL FIELD

The present invention relates to an infrared temperature sensor that detects temperature of a detection object in a non-contact manner, and to a method of manufacturing the infrared temperature sensor.

BACKGROUND ART

As a toner fixer used in an image forming apparatus such as a copier and a printer, a toner fixer of a type in which a toner image corresponding to image information is formed on a recording sheet through an electrophotographic operating process, and then unfixed toner is heated and fixed while the recording sheet is moved, is generally used.

The fixer presses the recording sheet and the toner carried on the recording sheet by static electricity between fixing means and pressurizing means, and moves the recording sheet and the toner while applying heat and pressure, thereby fusing and fixing the toner on the recording sheet. The fixing means includes a roller that conveys the recording sheet and the toner while rotating. The pressurizing means includes a roller that rotates in a direction opposite to the direction of the fixing means in press contact with the fixing means. The toner contains a resin material, a magnetic substance, and a colorant.

Temperature of the roller of the fixer largely influences image quality. Therefore, to control the temperature of the roller, temperature of a surface of the roller is detected by a sensor. An infrared temperature sensor that can detect temperature in a non-contact manner is used for the temperature detection in order to avoid damage of the roller. The infrared temperature sensor includes an infrared detection element and a temperature compensation element, detects, by the infrared detection element, a radiation heat quantity of infrared rays of a roller that is the fixing means as a detection object, and further detects atmospheric temperature by the temperature compensation element to compensate the temperature, thereby specifying the temperature of the detection object.

The applicant proposes, in Patent Literature 1, the infrared temperature sensor that can accurately measure the surface temperature of the detection object even in a severe detection temperature environment. More specifically, in the infrared temperature sensor disclosed in Patent Literature 1, a light guiding region corresponding to the infrared detection element and a light shielded region corresponding to the temperature compensation element are formed in substantially symmetric shapes, which makes it possible to make heat energy received by the infrared detection element and heat energy received by the temperature compensation element to equivalent to each other, except for direct radiation of the infrared rays. Further, the infrared temperature sensor disclosed in Patent Literature 1 calculates a difference between the detected temperature by the infrared detection element and the detected temperature by the temperature compensation element, to accurately detect only heat energy caused by the direct radiation of the infrared rays.

CITATION LIST

Patent Literature

Patent Literature 1: JP 5207329 B2

SUMMARY OF INVENTION

Technical Problem

Even when elements with equivalent characteristics are used, output of individual infrared temperature sensor is varied in some cases due to, for example, variation in a shape and a dimension of a case supporting the elements and an assembly error of parts configuring the sensor.

An object of the present invention is to provide an infrared temperature sensor that makes it possible to cope with variation of the output and is robust against disturbance to accurately measure the temperature of the detection object, and to provide a method of manufacturing the infrared temperature sensor.

Solution to Problem

A sensor according to the present invention detects temperature of a detection object in a non-contact manner, and includes: a sensor case that includes an opening part, and is provided with a light guiding region guiding infrared rays entering from the opening part, and a light shielded region closed from surroundings and shielded from the infrared rays; a film that is disposed to face the light guiding region and the light shielded region and is configured to absorb the infrared rays reaching through the light guiding region and to convert the infrared rays into heat; a sensor cover that is disposed to face the sensor case through the film; an infrared detection element that is disposed at a part of the film corresponding to the light guiding region; and a temperature compensation element that is disposed at a part of the film corresponding to the light shielded region.

The sensor case includes a base portion and a hood that surrounds the light guiding region and the light shielded region and is erected from the base portion.

The hood includes the opening part and a shielding part that protrudes toward an inside of the hood while defining the opening part and the light guiding region, and shields the light shielded region from the infrared rays. A protrusion direction of the shielding part toward the inside of the hood is adjustable.

In the infrared temperature sensor according to the present invention, the shielding part preferably includes a shielding part body that defines the opening part and shields the light shielded region from the infrared rays, and a protrusion wall that protrudes from a boundary between the opening part and the shielding part body toward the inside of the hood and partitions the light guiding region and the light shielded region. A protrusion direction of the protrusion wall is preferably adjustable.

In the infrared temperature sensor according to the present invention, the protrusion wall is preferably integrally formed with the shielding part body.

In the infrared temperature sensor according to the present invention, the protrusion wall is preferably attached to the shielding part body.

In the infrared temperature sensor according to the present invention, the hood is preferably formed in a rectangular shape long in a width direction that is orthogonal to a direction in which electric wires are drawn out in the infrared temperature sensor, in plan view. The opening part and the shielding part are each preferably formed in a rectangular shape to substantially bisect the hood in plan view.

In the infrared temperature sensor according to the present invention, the light guiding region and the light shielded region are preferably formed in substantially symmetric shapes.

Further, a method of manufacturing a sensor that detects temperature of a detection object in a non-contact manner, includes a step of fabricating a sensor case that is provided with a light guiding region guiding infrared rays entering from an opening part, and a light shielded region closed from surroundings and shielded from the infrared rays; a step of preparing a film that faces the light guiding region and the light shielded region, absorbs the infrared rays reaching through the light guiding region and converts the infrared rays into heat, and includes an infrared detection element disposed at a part corresponding to the light guiding region and a temperature compensation element disposed at a part corresponding to the light shielded region; a step of preparing a sensor cover that is disposed to face the sensor case through the film; and a step of assembling the sensor case and the sensor cover with the film in between. In the step of fabricating the sensor case, a shielding part that protrudes toward an inside of a hood surrounding the light guiding region and the light shielded region while defining the opening part and the light guiding region and shields the light shielded region from the infrared rays, is formed by causing the hood to be erected from a base portion through press processing using a plate member containing a metal material, and stamping and bending of the plate member corresponding to the opening part.

The method of manufacturing the infrared temperature sensor according to the present invention preferably further includes a step of adjusting a protrusion direction of the shielding part toward an inside of the hood.

Advantageous Effects of Invention

According to the present invention, the sensor case includes the hood as described in detail in Description of Embodiment. Therefore, even if wind caused by convection or the like occurs around the detection object that is a radiation source of the infrared rays, it is possible to suppress influence of the wind applied to the thermal influence on the infrared detection element and the temperature compensation element, and to obtain stable detection accuracy.

In addition, it is possible to correct the output of the infrared temperature sensor with use of the shielding part provided in the hood.

BRIEF DESCRIPTION OF DRAWINGS

FIG. 3 is a diagram illustrating a procedure of manufacturing the infrared temperature sensor illustrated in FIGS. 1A and 1B.

DESCRIPTION OF EMBODIMENT

Figure 1A:
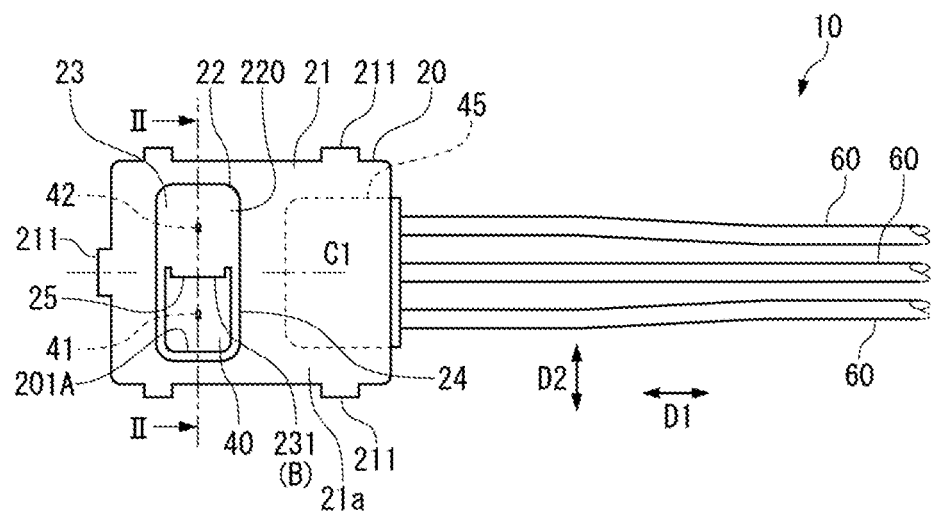
FIGS. 1A and 1B each illustrate an infrared temperature sensor according to an embodiment of the present invention, FIG. 1A being a plan view as viewed from front side, and FIG. 1B being a plan view as viewed from rear side.

An embodiment of the present invention is described below with reference to accompanying drawings.

Note that, in an infrared temperature sensor 10, a direction in which electric wires 60 are drawn out from an electric wire fixing region 45 along an in-plane direction of a film 40 (lateral direction in FIGS. 1A and 1B) is defined as a longitudinal direction D1, and a direction orthogonal to the longitudinal direction D1 in the in-plane direction of the film 40 (vertical direction in FIGS. 1A and 1B) is defined as a width direction D2. Moreover, a direction perpendicular to the film 40 (vertical direction in FIG. 2) is defined as a perpendicular direction D3.

Further, in the infrared temperature sensor 10, side on which infrared rays are radiated from an infrared radiation source such as a roller 2 is defined as front side, and side opposite thereto is defined as rear side.

Figure 4A:
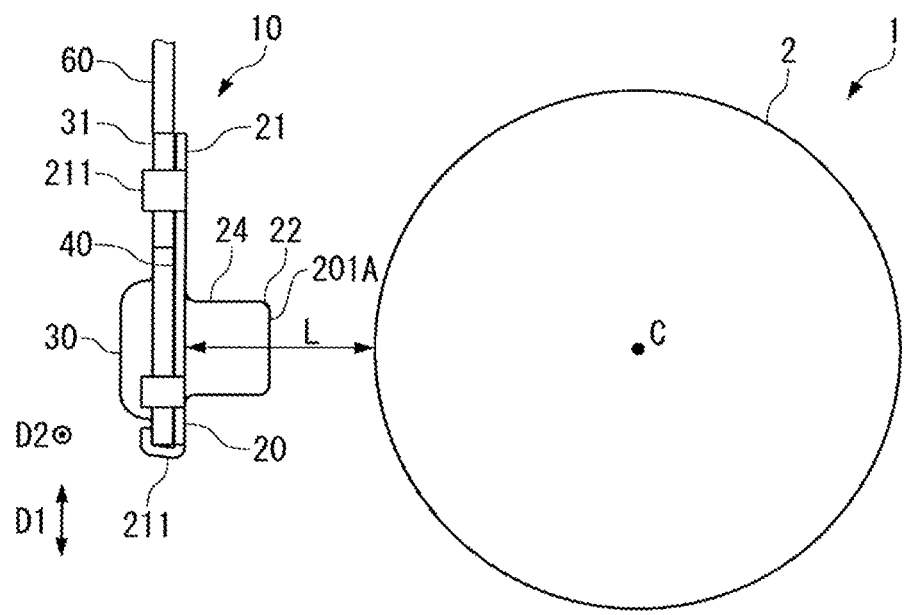
FIG. 4A is a diagram illustrating the infrared temperature sensor and a detection object (roller) according to the embodiment.

The infrared temperature sensor 10 according to the embodiment of the present invention is a sensor that detects temperature of the roller 2 in a non-contact manner, for example, as illustrated in FIG. 4A. The roller 2 is fixing means of a toner fixer 1 provided in an image forming apparatus such as a copier and a printer. The toner fixer 1 includes the roller 2 as the fixing means, and an unillustrated roller as pressurization means.

Next, a configuration of the infrared temperature sensor 10 is described with reference to FIGS. 1A and 1B and FIG. 2.

The infrared temperature sensor 10 includes a sensor case 20, a sensor cover 30 that faces rear side of the sensor case 20, the heat conversion film 40 (hereinafter, film 40) that is held between the sensor case 20 and the sensor cover 30, an infrared detection element 41 and a temperature compensation element 42 that are disposed on the film 40, and the plurality of electric wires 60 that are fixed to the electric wire fixing region 45 (FIG. 1B) of the film 40.

[Sensor Case]

Figure 2:
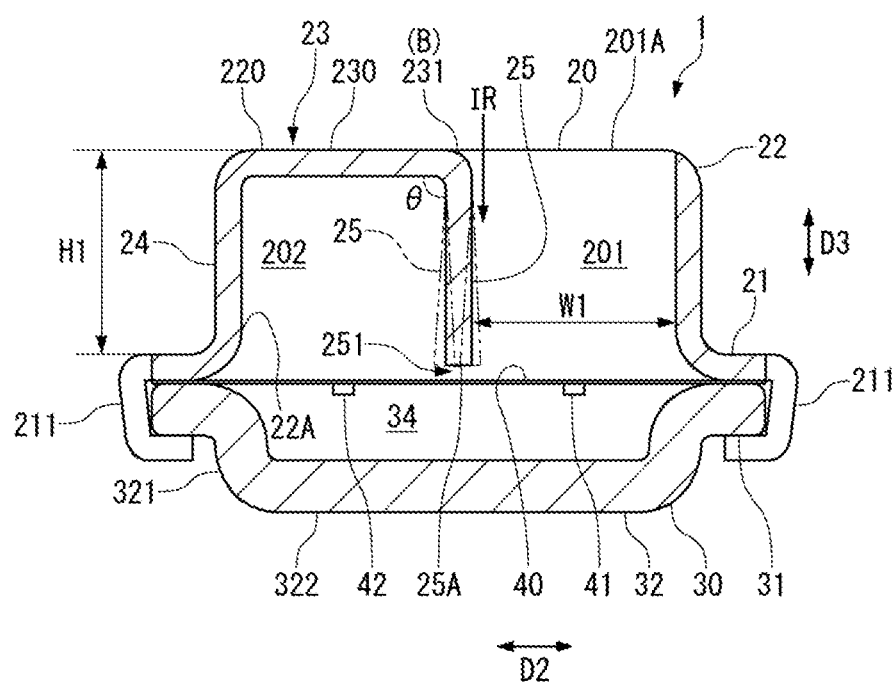
FIG. 2 is a cross-sectional view taken along a line II-II in FIG. 1A.

The sensor case 20 (FIG. 1A and FIG. 2) forms a light guiding region 201 (FIG. 2) and a light shielded region 202 (FIG. 2). The light guiding region 201 guides, to the film 40, the infrared rays radiated from the roller 2 as a detection object. The light shielded region 202 is adjacent to the light guiding region 201, and is closed from surroundings and is shielded from the infrared rays.

The sensor case 20 includes a case base portion 21 and a hood 22 that is erected upward in the perpendicular direction D3 from the case base portion 21.

The case base portion 21 includes a flat plate shape, and includes a substantially rectangular outer shape. Further, a lower surface of a region 21a on one side of the case base portion 21 faces the electric wire fixing region 45 described later, and the region 21a on the side covers an upper surface of the electric wire fixing region 45 of the film 40.

The sensor case 20 preferably contains a metal material. This is to achieve temperature equalization over the entire sensor case 20 by high thermal conductivity, and to increase infrared energy to be absorbed by the film 40 due to re-radiation and reflection of the infrared rays by a wall surface defining the light guiding region 201, to achieve high sensor output. The metal material is preferably sufficiently high in thermal conductivity, for example, like an aluminum alloy and a copper alloy.

In addition, in terms of reduction in a manufacturing cost and in size, the sensor case 20 is preferably formed with use of a plate member containing a metal material with a predetermined thickness. This is because, when the sensor case 20 is fabricated from the plate member containing a metal material through machining such as pressing, stamping, and bending, it is possible to suppress the thickness to achieve downsizing while suppressing manufacturing cost and achieving high dimension accuracy, as compared with casting (including die-casting) that requires a mold corresponding to the whole of the sensor case 20.

In the present embodiment, the sensor case 20 including the hood 22 is integrally fabricated by machining the plate member containing a metal material such as an aluminum alloy. The hood 22 is fabricated, with use of a plate member containing a metal material, through press processing such as deep drawing, and stamping and bending of a front end of a portion protruded by the drawing.

Note that the sensor case 20 may be fabricated from a resin material by injection molding. Also in this case, a resin material with high thermal conductivity is preferably used. For example, a resin material such as PPS (polyphenylene sulfide) and PP (polypropylene) may be used for the sensor case 20. High dimension accuracy is achievable by injection molding.

Any of the metal materials and the resin materials usable for the sensor case 20 described above may be used as a material of the sensor cover 30.

As illustrated in FIG. 2, the hood 22 surrounds the light guiding region 201 and the light shielded region 202. The hood 22 opens on the rear side of the case base portion 21.

As described later, the hood 22 is to prevent wind caused by temperature rise of the roller 2 from influencing the detected temperature detected by the infrared temperature sensor 10.

An opening part 201A that causes the infrared rays to enter the light guiding region 201 is provided at a part of a top portion 220 located at a front end of the hood 22.

The hood 22 includes the opening part 201A, a shielding part 23 that is adjacent to the opening part 201A at the top portion 220, and a side wall 24 that surrounds the light guiding region 201 and the light shielded region 202.

The shielding part 23 protrudes toward the inside of hood 22 while defining the opening part 201A and the light guiding region 201, and shields the light shielded region 202 from the infrared rays.

The shielding part 23 according to the present embodiment includes a shielding part body 230 and a protrusion wall 25. The shielding part body 230 defines the opening part 201A and shields the light shielded region 202 from the infrared rays. The protrusion wall 25 protrudes from a boundary B between the opening part 201A and the shielding part body 230 toward the inside of the hood 22, and partitions the light guiding region 201 and the light shielded region 202.

Further, the hood 22 is erected from the case base portion 21 in a substantially rectangular parallelepiped shape as a whole, and includes a rectangular shape long in the width direction D2 in plan view. The flat top portion 220 of the hood 22 is disposed at a predetermined height position from the case base portion 21 so as to be parallel to the case base portion 21.

The opening part 201A and the shielding part body 230 are both formed in a rectangular shape so as to substantially bisect the hood 22 in the width direction D2 in plan view.

To sufficiently secure an amount of the entering infrared rays, a part of the side wall 24 that defines at least the light guiding region 201 is preferably erected substantially perpendicular to the case base portion 21, and the opening part 201A is preferably formed, on the top portion 220 located inside an upper end edge of the side wall 24, so as to have almost the maximum area in both of the longitudinal direction D1 and the width direction D2 while remaining the shielding part body 230.

As illustrated in FIG. 2, a substantially rectangular parallelepiped space inside the hood 22 is partitioned by the protrusion wall 25 into the light guiding region 201 and the light shielded region 202.

The light guiding region 201 corresponds to a space that is surrounded by the protrusion wall 25, the side wall 24, and the film 40 and is opened to the opening part 201A.

The light shielded region 202 corresponds to a space that is surrounded by the shielding part 23, the side wall 24, and the film 40.

The light guiding region 201 and the light shielded region 202 are formed in substantially symmetric shapes. At this time, the substantially symmetric shapes indicate that a planar shape (rectangular shape) of the light guiding region 201 projected on the film 40 and a planar shape (rectangular shape) of the light shielded region 202 projected on the film 40 are substantially congruent with each other, and a height of the light guiding region 201 from the film 40 to the opening part 201A and a height of the light shielded region 202 from the film 40 to the shielding part body 230 are equivalent to each other. "Substantially congruent" includes a case where the planar shape of the light guiding region 201 and the planar shape of the light shielded region 202 are similar to each other and sizes of these planar shapes are slightly different from each other.

In the present embodiment, the light guiding region 201 and the light shielded region 202 are adjacent to each other in the width direction D2. As other embodiment, however, the light guiding region 201 and the light shielded region 202 may be adjacent to each other in the longitudinal direction D1.

The protrusion wall 25 protrudes from the boundary B between the opening part 201A and the shielding part body 230 toward the inside of the hood 22 while being cantilever-supported by the shielding part body 230, and partitions the light guiding region 201 and the light shielded region 202.

The protrusion wall 25 according to the present embodiment is a bent piece bent at an end edge 231 of the shielding part body 230. In the process of fabricating the sensor case 20, a part of the top portion 220 of the hood 22 is stamped out and is bent toward the inside of the hood 22. As a result, the protrusion wall 25 and the shielding part body 230 are formed, and the opening part 201A is formed on the top portion 220 as well. The protrusion wall 25 is integrally formed with the shielding part body 230, and is bent from the boundary B at a predetermined inclination to the shielding part body 230.

The protrusion wall 25 extends from the end edge 231 of the shielding part body 230 as the boundary B to the vicinity of the surface of the film 40, in a direction substantially orthogonal to the film 40. A clearance 251 is set between an end edge 25A of the protrusion wall 25 and the surface of the film 40. In the present embodiment, the boundary B between the opening part 201A and the shielding part body 230 is located on a center line C1 (FIG. 1A) that substantially bisects the infrared temperature sensor 10 in the width direction D2.

The infrared rays radiated from the roller 2 are directly applied to the film 40 only through the light guiding region 201 surrounded by the protrusion wall 25 and the side wall 24. The infrared rays straightly traveling in the light guiding region 201 do not go beyond the end edge 25A of the protrusion wall 25 along the film 40. Therefore, the infrared rays are not leaked to the light shielded region 202.

The protrusion wall 25 is inclined to the direction D3 as illustrated by an alternate long and two short dashes line in FIG. 2, which makes it possible to correct (calibrate) the output of the infrared temperature sensor 10 as described later.

A height H1 of the hood 22 from the case base portion 21 and a dimension W1 of the opening part 201A in the width direction D2 are equivalent to each other. Therefore, it is possible to obtain, as the bent piece that is obtained by bending a part of the metal plate member used for the hood 22 corresponding to the opening part 201A, the protrusion wall 25 that includes an appropriate dimension not interfering the surface of the film 40 while partitioning the internal space of the hood 22 into the light guiding region 201 and the light shielded region 202. In the processing of the front end of the portion protruded by the drawing processing, the front end is stamped out along three sides of the opening part 201A and is bent along a remaining side (boundary B). Appropriately setting relationship between the height H1 of the hood 22 and the dimension W1 of the opening part 201A provides the clearance 251 between the end edge 25A of the protrusion wall 25 and the surface of the film 40. Scraps are not generated because it is unnecessary to cut off an end part of the protrusion wall 25.

Note that the height H1 may be determined depending on, for example, a distance from the roller 2 as the detection object to the infrared temperature sensor 10.

[Heat Conversion Film]

When irradiated with the infrared rays, the film 40 (FIG. 2) converts energy of the infrared rays into heat. The heat converted by the film 40 is transferred to the infrared detection element 41 and the temperature compensation element 42.

The film 40 supports the infrared detection element 41 and the temperature compensation element 42. In the present embodiment, the infrared detection element 41 and the temperature compensation element 42 are disposed on the rear side of the film 40. The infrared detection element 41 and the temperature compensation element 42 are electrically connected to an unillustrated wiring pattern provided on the film 40. An end part of the wiring pattern is electrically connected to the electric wires 60 in the electric wire fixing region 45 (FIG. 1B) of the film 40. The electric wires 60 are fixed to the electric wire fixing region 45 of the film 40 with a mold resin, etc. Further, the electric wires 60 are drawn out from one side of the electric wire fixing region 45 along the longitudinal direction D1. The other side of the electric wire fixing region 45 in the longitudinal direction D1 is adjacent to the hood 22 of the sensor case 20.

The film 40 is formed in a shape substantially coincident with the outer shape of each of the sensor case 20 and the sensor cover 30. The film 40 is disposed to support the infrared detection element 41 and the temperature compensation element 42. In addition, the film 40 is disposed so as to face both of the light guiding region 201 and the light shielded region 202 to which the infrared rays do not enter, in order to make thermal influence on the infrared detection element 41 and thermal influence on the temperature compensation element 42 (excluding thermal influence caused by direct radiation of infrared rays) equivalent to each other.

A peripheral edge part of the film 40 is held between the sensor case 20 and the sensor cover 30 over four sides. An opening 22A (FIG. 2) of the hood 22 on a base end side is closed with the film 40.

The film 40 is formed with use of a resin containing a polymer material. The kind of the resin is not limited as long as the resin absorbs the infrared rays, and well-known resins such as PPS (polyphenylene sulfide), polyimide, polyester, and polyethylene may be used. Further, a material other than the resin may be used as long as the material absorbs the infrared rays.

The thickness of the film 40 is optionally set; however, the thickness of the film 40 is preferably about 5 μm to about 50 μm in order to sufficiently secure infrared absorptance and to prevent occurrence of wrinkles at a time when the film 40 is sandwiched between the sensor case 20 and the sensor cover 30.

[Infrared Detection Element and Temperature Compensation Element]

The infrared detection element 41 detects temperature raised by heat that occurs when the infrared rays radiated from the surface of the roller 2 as the detection object are absorbed by the film 40. The temperature compensation element 42 detects atmospheric temperature. The infrared detection element 41 and the temperature compensation element 42 include substantially equivalent temperature characteristics.

The infrared detection element 41 is disposed at a part of the film 40 corresponding to the light guiding region 201.

The temperature compensation element 42 is disposed at a part of the film 40 corresponding to the light shielded region 202.

As the infrared detection element 41 and the temperature compensation element 42, a small resistor including a temperature coefficient, such as a thin film thermistor and a platinum temperature sensor is widely used without being limited to a specific material and a specific shape.

The infrared rays radiated from the roller 2 toward the infrared temperature sensor 10 pass through the light guiding region 201 from the opening part 201A, and are applied not only to the film 40 but also to the shielding part 23 and the side wall 24 of the hood 22 and the case base portion 21. Further, each of the elements of the sensor case 20 is influenced by heat derived from convection occurred due to heat generation of the roller 2, etc. The sensor cover 30 is also influenced by heat derived from convection around the roller 2, etc.

The infrared detection element 41 detects temperature under thermal influence of the atmospheric temperature (including sensor case 20 and sensor cover 30) in addition to the infrared rays radiated from the roller 2, and the temperature compensation element 42 detects temperature under thermal influence of the atmospheric temperature. Therefore, conceptually, the thermal influence on each of the elements 41 and 42 as described below is ideal.

infrared detection element−temperature compensation element=("direct radiation"+"thermal conduction"+"convection"+"re-radiation")−("thermal conduction"+"convection"+"re-radiation")

Here, among the thermal influence from the detection object, difference between the influence on the infrared detection element 41 and the influence on the temperature compensation element 42 is only "direct radiation" of the infrared rays. Therefore, the infrared temperature sensor 10 according to the embodiment of the present invention can accurately detect the temperature of the surface of the detection object, based on the difference between the detected temperature by the infrared detection element 41 and the detected temperature by the temperature compensation element 42. Incidentally, it is premised that the thermal influence by "thermal conduction"+"convection"+"re-radiation" to the infrared detection element 41 and the thermal influence by "thermal conduction"+"convection"+"re-radiation" to the temperature compensation element 42 are the same as each other.

Accordingly, it is desirable to make the thermal influence by the thermal conduction, the convection, and the re-radiation to the infrared detection element 41 and the temperature compensation element 42 equal to each other.

In the present embodiment, as described later, the thermal influence received by the infrared detection element 41 and the thermal influence received by the temperature compensation element 42 are made substantially equivalent to each other by symmetry of the positions of the elements 41 and 42 and symmetry of the shapes of the light guiding region 201 and the light shielded region 202, except for the direct radiation of the infrared rays from the roller 2.

[Sensor Cover]

Figure 1B:
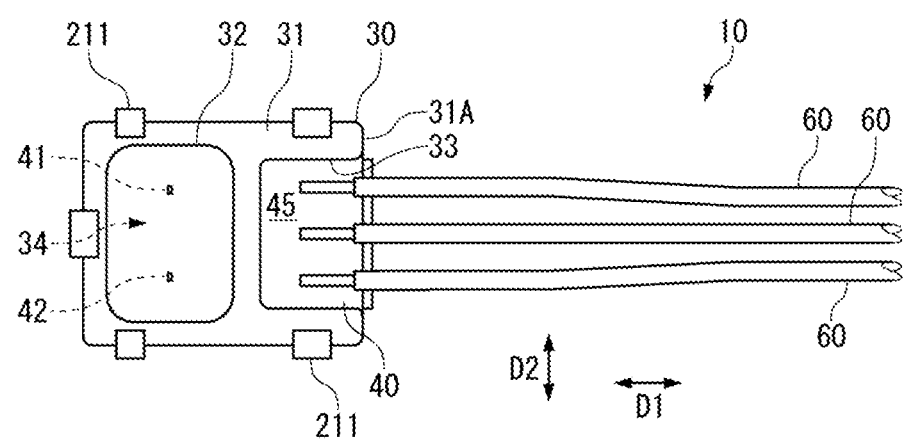

As illustrated in FIG. 1B and FIG. 2, the sensor cover 30 includes a flat plate-shaped cover base portion 31 and an element accommodating dome 32 including a hollow portion 34 inside thereof. The element accommodating dome 32 protrudes from the cover base portion 31 toward the rear side of the infrared temperature sensor 10, and the hollow portion 34 accommodates the infrared detection element 41 and the temperature compensation element 42.

The sensor cover 30 according to the present embodiment is formed, for example, with use of a resin material having high thermal conductivity by injection molding. The sensor cover 30, however, may be formed with use of a plate member containing a metal material by press processing.

As illustrated in FIG. 1B, an outer shape of the cover base portion 31 is formed in a rectangular shape.

The cover base portion 31 includes a notch 33 that exposes the electric wire fixing region 45. The notch 33 is formed by stamping out a predetermine range forward of a rear end 31A of the cover base portion 31 in a substantially U-shape.

The cover base portion 31 and the case base portion 21 are superimposed with the film 40 in between. A joining piece 211 provided in the case base portion 21 is bent toward the rear side of the cover base portion 31 and is crimped. As a result, the sensor case 20 and the sensor cover 30 are assembled.

Note that the sensor case 20 and the sensor cover 30 may be joined by an appropriate method without being limited to the present embodiment.

When the sensor case 20 and the sensor cover 30 are assembled, the film 40 is disposed in a space closed from the outside except for the opening part 201A. The infrared detection element 41 and the temperature compensation element 42 that are located on the rear side of the film 40 are disposed in the closed space without an opening part by the film 40 and the sensor cover 30. This makes it possible to avoid the characteristics and the like of the elements 41 and 42 from being influenced by entry of foreign matters from the outside. Note that the hollow portion 34 of the element accommodating dome 32 desirably includes sealability of a degree preventing entry of foreign matters.

An outer shell of the element accommodating dome 32 is formed in a truncated pyramid shape. The element accommodating dome 32 includes a side wall 321 that inclinedly rises from the cover base portion 31, a bottom floor 322 that is disposed at a front end of the side wall 321, and the hollow portion 34.

The element accommodating dome 32 is provided on the sensor cover 30 over a range including regions to which the light guiding region 201 and the light shielded region 202 are respectively projected.

The infrared detection element 41 and the temperature compensation element 42 that are disposed in the hollow portion 34 of the element accommodating dome 32 are disposed so as to be separated by a predetermined distance from the bottom floor 322 of the element accommodating dome 32. The air in the hollow portion 34 of the element accommodating dome 32 functions as a heat-insulating layer, and minimizes thermal influence on the infrared detection element 41 and the temperature compensation element 42 from the outside, in particular, from the rear side of the infrared temperature sensor 10. The present invention, however, does not eliminate a form in which the infrared detection element 41 and the temperature compensation element 42 come into direct contact with the sensor cover 30.

To house the electric wires 60 drawn out from the inside of the notch 33 within a thickness range of the cover base portion 31, a thickness of the sensor cover 30 is preferably set to be equal to or larger than a diameter (outer diameter) of each of the electric wires 60. The sensor case 20 may be formed to have a thickness smaller than the thickness of the sensor cover 30 as long as the sensor case 20 includes necessary rigidity.

Unlike the present embodiment, a notch may be provided in the sensor case 20. In this case, the thickness of the sensor case 20 is made equal to or larger than the outer diameter of each of the electric wires 60, and the thickness of the sensor cover 30 may be set smaller than the thickness of the sensor case 20.

In the present embodiment, as described above, the electric wires 60 are drawn out from the electric wire fixing region 45 toward one side in the longitudinal direction D1, and the hood 22 is disposed adjacently to the other side of the electric wire fixing region 45 in the longitudinal direction D1. Further, the light guiding region 201 and the light shielded region 202 formed by the hood 22 are adjacent to each other in the width direction D2. According to the present embodiment, the necessary components are neatly disposed, which makes it possible to contribute to downsizing of the infrared temperature sensor 10.

[Symmetry of Shapes and Positions]

To accurately detect the temperature of the detection object that radiates the infrared rays, the present embodiment includes the symmetric configuration for the elements 41 and 42 and the space around the elements 41 and 42.

First, as described above, the light guiding region 201 and the light shielded region 202 are formed in the substantially symmetric shapes.

Next, the infrared detection element 41 and the temperature compensation element 42 are disposed substantially symmetrically to each other. More specifically, the infrared detection element 41 and the temperature compensation element 42 are disposed at positions line-symmetric about, as a symmetric axis (on center line C1 in FIG. 1A), the boundary B between the opening part 201A and the shielding part body 230 that also corresponds to the boundary between the light guiding region 201 and the light shielded region 202. Examples of the line-symmetric arrangement include, in addition to a configuration in which the infrared detection element 41 is disposed at the center of the light guiding region 201 and the temperature compensation element 42 is disposed at the center of the light shielded region 202 in plan view as with the present embodiment, a configuration in which the infrared detection element 41 and the temperature compensation element 42 are disposed at positions close to or separated from the boundary B relative to the positions (center in light guiding region 201 or center in light shielded region 202) in the present embodiment. Further, other examples of the line-symmetric arrangement include a configuration in which both of the infrared detection element 41 and the temperature compensation element 42 are displaced in one direction of the longitudinal direction D1 from the respective positions (respective centers) in the present embodiment.

In addition, the element accommodating dome 32 is also preferably formed in a line-symmetric shape about the boundary B.

In the present embodiment, the sensor case 20 and the sensor cover 30 are formed of a metal material with high thermal conductivity or a resin material, which achieves temperature equalization of the infrared temperature sensor 10. In addition, the light guiding region 201 corresponding to the infrared detection element 41 and the light shielded region 202 corresponding to the temperature compensation element 42 are formed in the substantially symmetric shapes, and the infrared detection element 41 and the temperature compensation element 42 are disposed substantially symmetric to each other. This allows the entire infrared temperature sensor 10 to equally receive "thermal conduction"+"convection"+"re-radiation" from the roller 2, and to equivalently apply thermal influence on the infrared detection element 41 and the temperature compensation element 42 that detect the temperature.

When the infrared detection element 41 and the temperature compensation element 42 are formed in the substantially symmetric shapes, and the infrared detection element 41 and the temperature compensation element 42 are disposed symmetric to each other as with the present embodiment, the infrared detection element 41 and the temperature compensation element 42 both can equivalently receive "thermal conduction"+"convection"+"re-radiation" from the roller 2.

Accordingly, the difference between the thermal influence on the infrared detection element 41 and the thermal influence on the temperature compensation element 42 is only "direct radiation" of the infrared rays, which allows for accurate detection of the surface temperature of the roller 2 that radiates the infrared rays. In other words, when the temperature of the roller 2 is raised and the radiation amount of the infrared rays is increased, a resistance value of each of the infrared detection element 41 and the temperature compensation element 42 is varied, and the influence of "direct radiation" is outputted as the difference between variation of the resistance values of the respective elements 41 and 42.

[Manufacturing of Infrared Temperature Sensor]

The infrared temperature sensor 10 is manufacturable by, for example, a procedure illustrated in FIG. 3.

The sensor case 20, the sensor cover 30, the film 40, the infrared detection element 41, the temperature compensation element 42, and the electric wires 60 are separately prepared (steps S1 to S5). Note that the order of steps of respectively preparing the components is optionally set.

The metal sensor case 20 is fabricated in such a manner that the plate member containing a metal material is used, the hood 22 is formed through deep drawing (S11) and stamping and bending (S12), and the case base portion 21 is stamped out in a predetermined outer shape (S13) (step S1).

The sensor cover 30 is fabricated by injection molding in a case of the resin sensor cover 30 (step S2).

The film 40 mounted with the elements 41 and 42 is sandwiched between the sensor case 20 and the sensor cover 30 separately fabricated, and the sensor case 20 and the sensor cover 30 are assembled together by appropriate means such as crimping (step S6).

When the sensor case 20 and the sensor cover 30 are assembled to each other, the electric wires 60 can be fixed, with use of a mold resin such as an epoxy resin, to the electric wire fixing region 45 that is exposed from the notch 33 of the cover base portion 31 and is supported by the case base portion 21 (step S7).

The assembly of the infrared temperature sensor 10 is completed through the above-described procedure (step S8). The sensor case 20 that includes the hood 22 as a feature element of the infrared temperature sensor 10 and the protrusion wall 25 provided on the hood 22 is manufactured in a small size with low cost when an easily-available metal plate member is used and pressing, stamping, and bending are performed thereon.

In addition, adjusting the protrusion direction and the attitude of the protrusion wall 25 provided on the hood 22 by bending makes it possible to correct the output of the infrared temperature sensor 10 (step S9).

The infrared temperature sensor 10 is manufactured in the above-described manner.

An unillustrated temperature detection circuit is connectable to the electric wires 60. For example, a well-known temperature detection circuit disclosed in Patent Literature 1 is adoptable. The temperature of the detection object is detectable with use of such a temperature detection circuit by a well-known method.

In the present embodiment, since the electric wire fixing region 45 is located on the rear side of the infrared temperature sensor 10, the infrared rays radiated from the roller 2 as a heat source toward the front side of the infrared temperature sensor 10 are not directly applied to the electric wire fixing region 45. This makes it possible to avoid melting and scattering of the mold resin provided in the electric wire fixing region 45.

Action and Effects by Hood

Action and effects by the hood 22 provided in the infrared temperature sensor 10 are described below.

As illustrated in FIG. 4A, the infrared temperature sensor 10 is disposed separately from the roller 2 such that the opening part 201A located at the front end of the hood 22 is directed toward the surface of the roller 2. At this time, the infrared temperature sensor 10 is disposed such that the width direction D2 connecting the infrared detection element 41 and the temperature compensation element 42 becomes parallel to the axis line C of the roller 2 as illustrated in FIG. 4A, in order to make temperature gradient of the infrared detection element 41 and temperature gradient of the temperature compensation element 42 equal to each other with respect to the roller 2 as the heat source.

Note that the width direction D2 is not necessarily strictly parallel to the axis line C, and slight deviation is allowable. A distance from the surface of the roller 2 to the infrared detection element 41 and a distance from the surface of the roller 2 to the temperature compensation element 42 are preferably equal to or substantially equal to each other.

The infrared rays radiated from the roller 2 toward the infrared temperature sensor 10 reach the film 40 by being guided through the light guiding region 201 from the opening part 201A, and are absorbed into the film 40. The infrared energy is converted into heat energy through absorption by the film 40, and the heat energy is transferred to the infrared detection element 41.

At this time, the infrared rays to be absorbed into the film 40 contain, in addition to the component directly radiated to the film 40 through the light guiding region 201 as described above, the component re-radiated by the side wall 24 and the like of the hood 22, raised in temperature due to radiation of the infrared rays from the roller 2.

As described above, the thermal conduction from the roller 2 through the air and the convection occurred around the roller 2 also thermally influence the elements 41 and 42 on the film 40, in addition to that the direct radiation and the re-radiation thermally influence the elements 41 and 42 on the film 40.

Figure 4B:
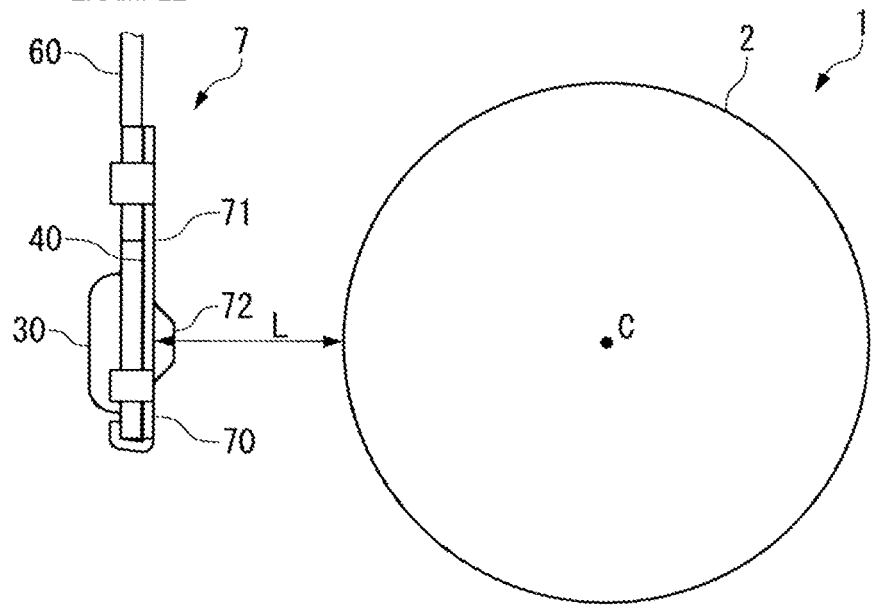
FIG. 4B is a diagram illustrating an infrared temperature sensor and a detection object (roller) according to a comparative example.

FIG. 4B illustrates an infrared temperature sensor 7 according to a comparative example relative to the present embodiment.

Unlike the infrared temperature sensor 10 according to the present embodiment, the infrared temperature sensor 7 includes a sensor case 70 that is not provided with the hood 22. A hole (not illustrated) penetrating through a flat base portion 71 of the sensor case 70 in a thickness direction is provided in the base portion 71. A space surrounded by an inner wall of the hole corresponds to the light guiding region in the present embodiment, and an opening of the hole located on a surface of the base portion 71 corresponds to the opening part in the present embodiment. A light shielding dome 72 that is protruded, from the base portion 71, with a dimension substantially equivalent to a thickness of the base portion 71 is provided on the sensor case 70. An outer shell of the light shielding dome 72 is formed in a truncated pyramid shape. An internal space of the light shielding dome 72 corresponds to the light shielded region in the present embodiment.

The infrared temperature sensor 7 includes a configuration similar to the configuration of the infrared temperature sensor 10 according to the present embodiment except for the shape of the sensor case 70. A dimension of an outer shape and the characteristics of the elements 41 and 42 in the infrared temperature sensor 7 are similar to those of the infrared temperature sensor 10 according to the present embodiment.

The infrared temperature sensor 7 according to the comparative example is also disposed such that the width direction D2 connecting the infrared detection element 41 and the temperature compensation element 42 on the film 40 becomes parallel to the axis line C of the roller 2.

The detection results detected by the infrared temperature sensor 10 according to the present embodiment and by the infrared temperature sensor 7 according to the comparative example, relating to influence of wind around the roller 2, are illustrated below.

Figure 5:
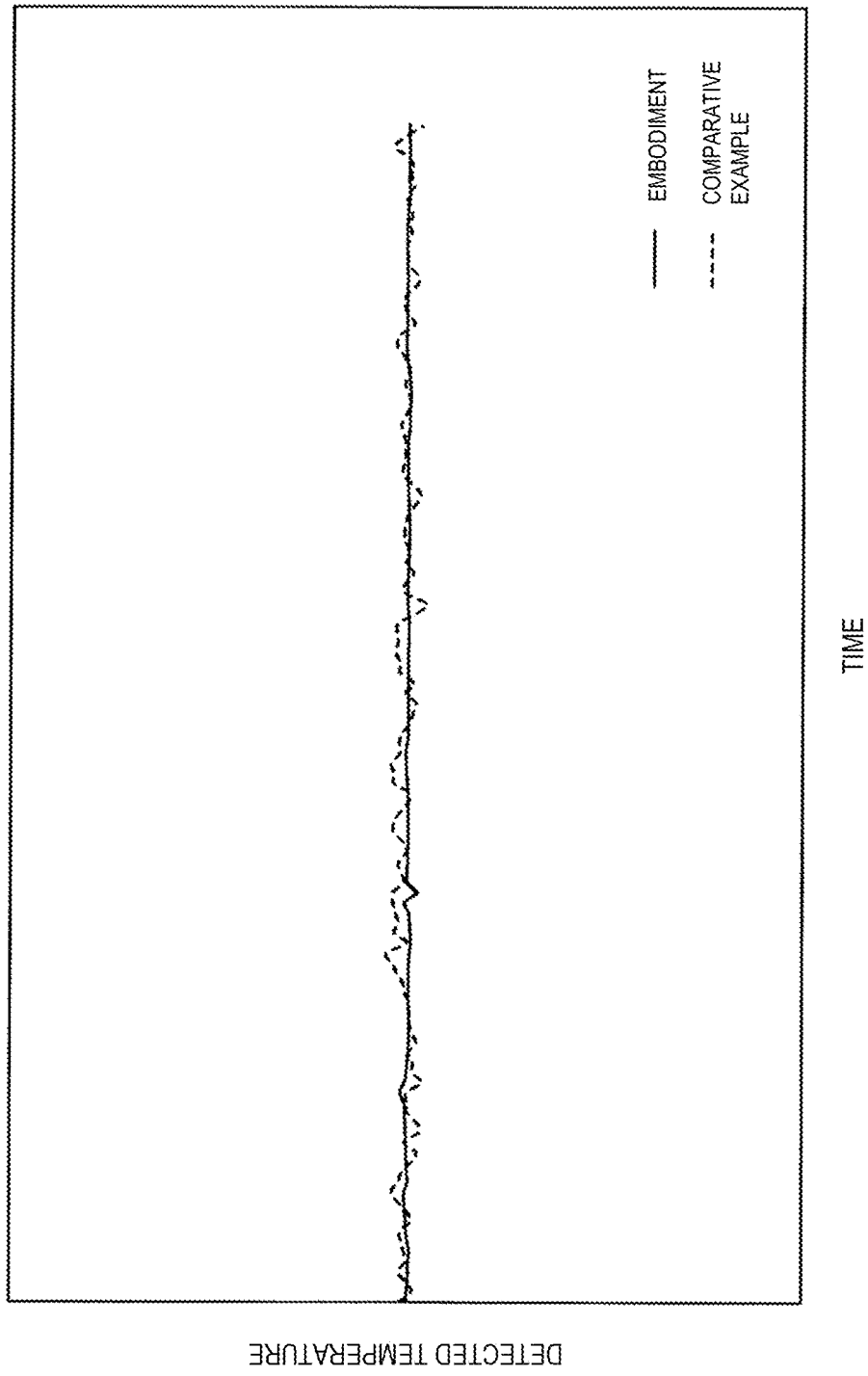
FIG. 5 is a graph illustrating variation of detected temperature of the roller with time in a calm state.
Figure 6:
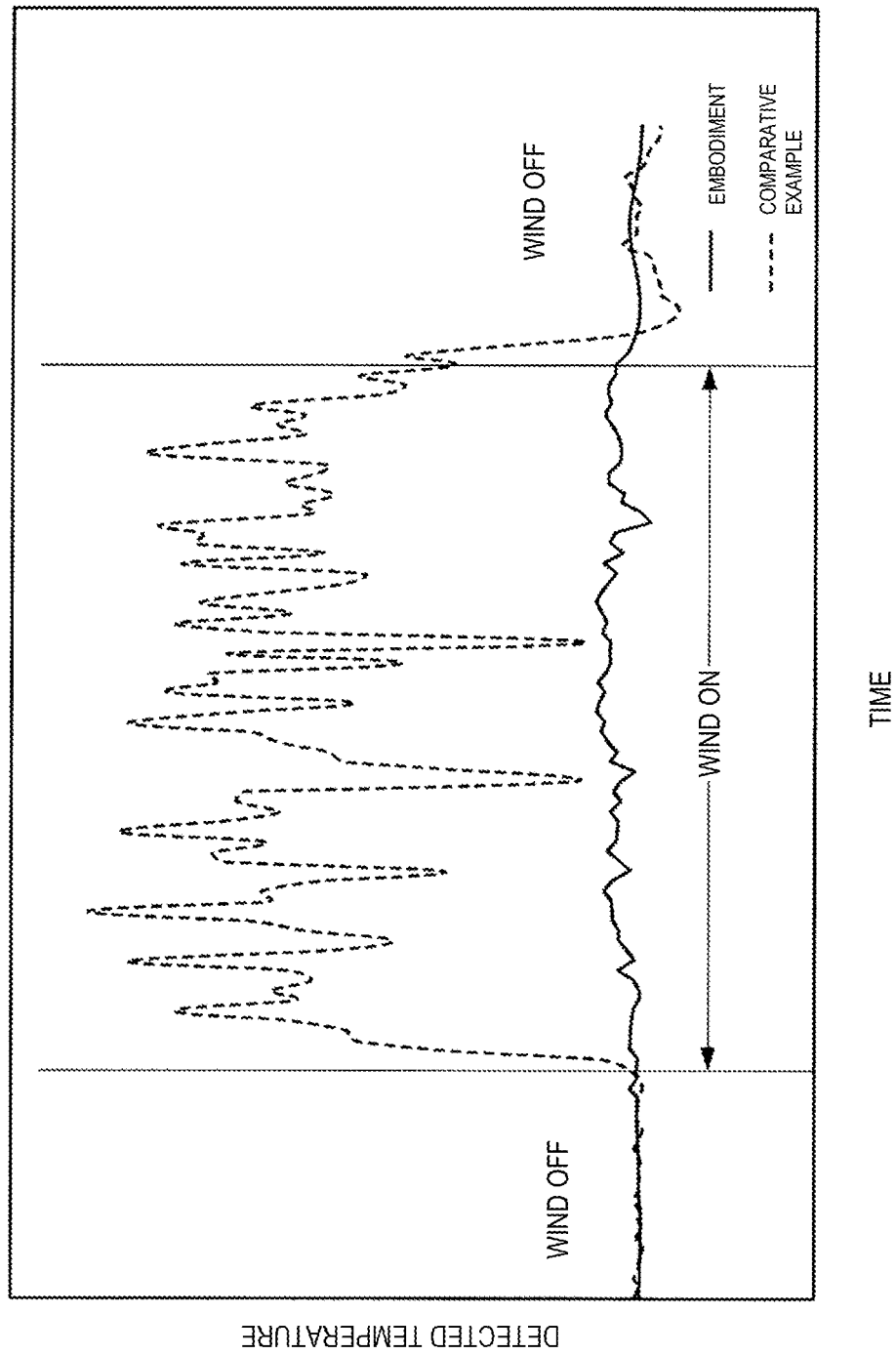
FIG. 6 is a graph illustrating variation of the detected temperature of the roller with time under influence of wind.

As for the detection results illustrated in FIG. 5 to FIG. 7, a distance L (FIG. 3) from the infrared detection element 41 and the temperature compensation element 42 on the film 40 to the surface of the roller 2 is set to the same value in both of the present embodiment and the comparative example.

FIG. 5 illustrates the detection results of the present embodiment and the comparative example in a calm state in which little wind occurs around the roller 2. To produce the calm state, surroundings of the roller 2 including the infrared temperature sensor 10 or 7 are covered with an unillustrated windshield cover.

In FIG. 5, the temperature of the roller 2 that is detected by the infrared temperature sensor 10 according to the present embodiment, based on the difference between the temperature acquired by the infrared detection element 41 and the temperature acquired by the temperature compensation element 42, is illustrated by a solid line. Likewise, the temperature of the roller 2 that is detected by the infrared temperature sensor 7 according to the comparative example, based on the difference between the temperature acquired by the infrared detection element 41 and the temperature acquired by the temperature compensation element 42, is illustrated by a dashed line.

Figure 7A:
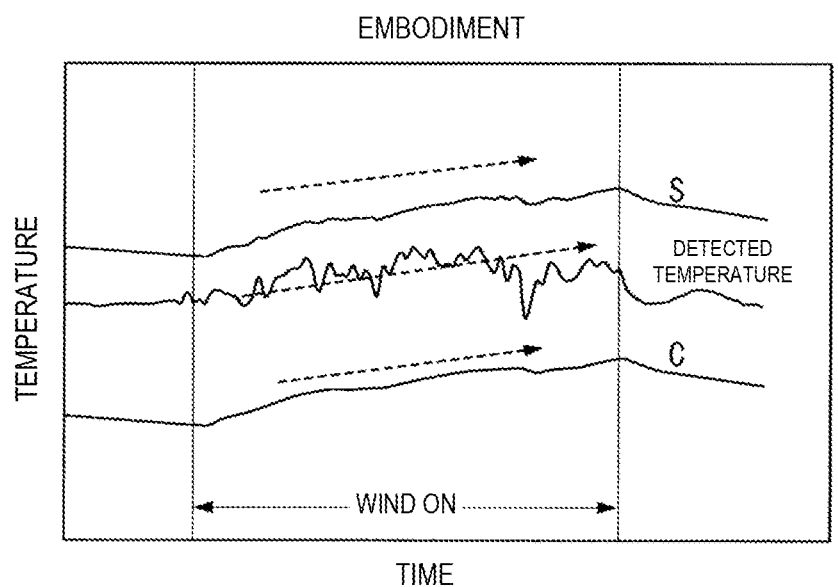
FIG. 7A is a graph illustrating temperature S and C that are respectively acquired from an infrared detection element and a temperature compensation element of the infrared temperature sensor according to the present embodiment, and a detected temperature based on difference between the temperature S and C.
Figure 7B:
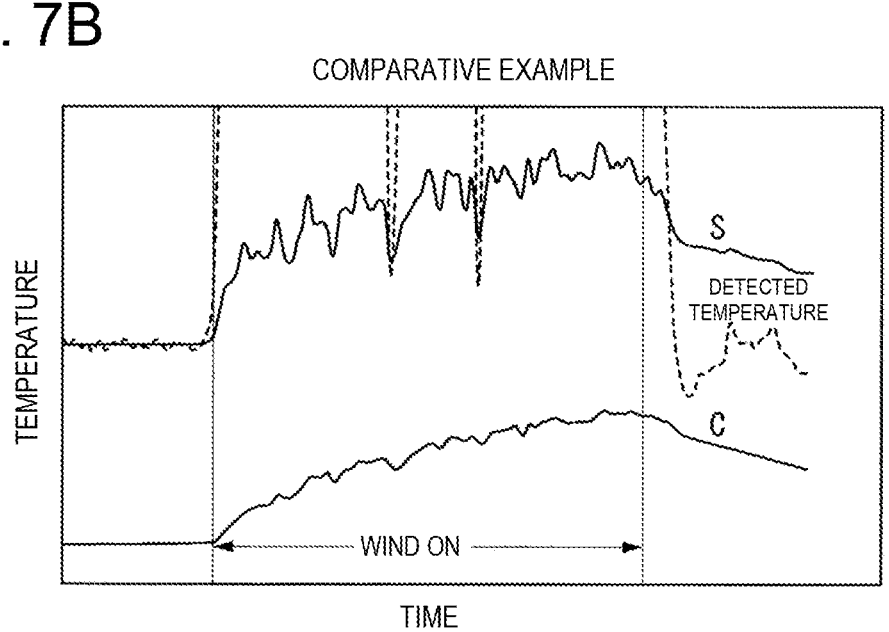
FIG. 7B is a graph illustrating temperature S and C that are respectively acquired from an infrared detection element and a temperature compensation element of the infrared temperature sensor according to the comparative example, and a detected temperature based on difference between the temperature S and C.

The meanings of the solid line and the dashed line are the same also in FIG. 6 and FIGS. 7A and 7B.

In FIG. 5, substantially-constant temperature that is little varied with time is detected as the temperature of the roller 2 by the infrared temperature sensor 10 according to the present embodiment. In contrast, the temperature of the roller 2 detected by the infrared temperature sensor 7 according to the comparative example is obviously varied as compared with the detected temperature of the roller 2 according to the present embodiment. It is considered that such variation occurs because the air coming into contact with the elements 41 and 42 flows due to the convection around the roller 2 even in the calm state and the air flow influences the detected temperature. The air in the light guiding region 201 that opens to the outside through the opening part 201A easily flows, as compared with the air in the light shielded region 202. Therefore, the flow of the contact air easily influences particularly to the temperature acquired by the infrared detection element 41 corresponding to the light guiding region 201.

Since the hood 22 that is not provided in the comparative example is provided in the present embodiment, the air coming into contact with the elements 41 and 42 is difficult to flow as compared with the comparative example, even when convection occurs around the roller 2. Accordingly, when the radiation amount of the infrared rays from the roller 2 is constant, the infrared temperature sensor 10 according to the present embodiment outputs constant detected temperature. When the temperature of the surface of the roller 2 as the heat source is varied, the detected temperature by the infrared temperature sensor 10 is varied following the surface temperature of the roller 2.

Next, wind is caused around the roller 2, and influence of the wind to the detected temperature in each of the present embodiment and the comparative example is confirmed. In this case, an unillustrated blower placed beside the roller 2 feeds wind toward the roller 2 in a direction along the axis line C. Wind velocity is, for example, 0.5 m/second. The air from the blower flows along the surface of the roller 2 in the direction of the axis line C.

In FIG. 6, a time in which the wind is fed by the blower is denoted by ON. The wind feeding is OFF before and after the ON time.

As illustrated in FIG. 6, the detected temperature (dashed line) of the roller 2 according to the comparative example is significantly varied by the wind. Since the hood 22 blocking the wind is not provided in the comparative example, the wind enters the light guiding region opened on the surface of the base portion 71 and the wind also enters the light shielded region (inside of light shielding dome 72) that communicates with the light guiding region. Accordingly, the wind strongly influences the temperature acquired by the elements 41 and 42.

The detected temperature (solid line) of the roller 2 according to the present embodiment is also varied while the wind feeding is ON, as compared with the detected temperature when the wind feeding is OFF. Since the light guiding region 201 and the light shielded region 202 are surrounded by the hood 22, the wind blown to the infrared temperature sensor 10 from the side is blocked by the hood 22. Therefore, the influence of the wind to the temperature acquired by the elements 41 and 42 respectively corresponding to the light guiding region 201 and the light shielded region 202 is obviously smaller than that in the comparative example.

Next, influence of the wind to the detected temperature of the roller 2 is verified by illustrating waveforms of the temperature individually acquired from the infrared detection element 41 and the temperature compensation element 42.

In FIG. 7B, the temperature detected by the infrared detection element 41 provided in the infrared temperature sensor 7 according to the comparative example is denoted by S, and the temperature detected by the temperature compensation element 42 provided in the infrared temperature sensor 7 according to the comparative example is denoted by C.

As illustrated in FIG. 7B, the temperature (S) acquired by the infrared detection element 41 and the temperature (C) acquired by the temperature compensation element 42 are different in waveform from each other. The temperature (S) acquired by the infrared detection element 41 is larger in ripple than the temperature (C) acquired by the temperature compensation element 42. This indicates that the air coming into contact with the infrared detection element 41 largely flows because the wind occurring around the roller 2 enters the light guiding region. In other words, in the comparative example, the wind directly influences the detection of the heat by the infrared detection element 41. As a result, difference between the temperature (S) and the temperature (C) is largely varied, and the detected temperature of the roller 2 is significantly varied.

In contrast, in the present embodiment illustrated in FIG. 7A, the waveform of the temperature (S) acquired by the infrared detection element 41 and the waveform of the temperature (C) acquired by the temperature compensation element 42 are similar to each other, and are both little varied. The variation of the temperature (S) with time and the variation of the temperature (C) with time have similar tendency as gradient of variation illustrated by dashed arrows in FIG. 7A. The variation tendency of the temperature (S) and the temperature (C) is similar to variation tendency of the detected temperature by the infrared temperature sensor 10.

Since the infrared temperature sensor 10 according to the present embodiment includes the hood 22, even if the wind is blown to the infrared temperature sensor 10, the blowing wind does not directly influence the detected temperature. Even though the detected temperature is varied due to influence of convection while the wind occurs around the roller 2, a width of the variation is small (e.g., about ±0.5° C.) and the detected temperature is stable.

Therefore, the infrared temperature sensor 10 according to the present embodiment is robust against disturbance due to the wind, and makes it possible to accurately detect the temperature of the roller 2 as the detection object. Accordingly, it is possible to provide the infrared temperature sensor 10 for an application to control the temperature of the roller 2.

In the present invention, the symmetric shapes of the light guiding region 201 and the light shielded region 202 and the symmetric arrangement of the elements 41 and 42 as descried above are not essential but preferable in order to more accurately obtain the difference between the temperature acquired by the respective elements 41 and 42 based on the direct radiation of the infrared rays from the roller 2, to lead to more accurate temperature detection.

In other words, according to the present embodiment, the light guiding region 201 and the light shielded region 202 are formed in the symmetric shapes and the elements 41 and 42 are symmetrically disposed, in addition to that the hood 22 blocking wind is provided. This makes it possible to more accurately detect the temperature of the detection object.

Action and Effects of Shielding Part

The hood 22 that can suppress influence of wind to the detected temperature as described above includes the shielding part 23 including the protrusion wall 25. The attitude of the protrusion wall 25 of the shielding part 23 is changeable as illustrated by an alternate long and two short dashes line in FIG. 2. The protrusion direction of the protrusion wall 25 toward the inside of the hood 22 is adjusted in the above-described manner, which makes it possible to correct (calibrate) the output of the individual infrared temperature sensor 10.

For example, when the protrusion wall 25 is inclined to the direction D3 perpendicular to the film 40 so as to increase a bending angle θ formed by the protrusion wall 25 with respect to the shielding part body 230 of the shielding part 23, a part of infrared rays IR entering the light guiding region 201 along the perpendicular direction D3 is blocked by the protrusion wall 25. Accordingly, the energy of the infrared rays reaching the film 40 is reduced, and the heat energy caused through absorption of the infrared rays by the film 40 is also reduced. As a result, the output of the infrared temperature sensor 10 is reduced.

In contrast to the above description, when the protrusion wall 25 is inclined to the perpendicular direction D3 so as to reduce the bending angle θ, the infrared rays entering and straightly traveling in the light guiding region 201 along the perpendicular direction D3 are not blocked by the protrusion wall 25 from the position of the opening part 201A to the position of the film 40. Accordingly, it is possible to increase the energy of the infrared rays reaching the film 40 to increase the output of the infrared temperature sensor 10.

According to the present embodiment, the correction is performed, with use of the protrusion wall 25 provided in the hood 22, to match the output to a predetermined reference output, which makes it possible to suppress variation of the output and to stabilize quality of the infrared temperature sensor 10. The attitude of the protrusion wall 25 is easily adjustable because the protrusion wall 25 is formed by bending.

To correct the output of the infrared temperature sensor 10, for example, a part of a peripheral edge of the opening part 201A or a part of the side wall 24 or the protrusion wall 25 facing the light guiding region 201 may be removed by cutting, or the like. Alternatively, the output of the infrared temperature sensor 10 is also correctable by depositing and fixing an adhesive or the like in a padding shape on a part of the peripheral edge of the opening part 201A or a part of the side wall 24 or the protrusion wall 25 facing the light guiding region 201.

The adjustment of the protrusion direction of the protrusion wall 25 described above is also applicable to a case where the sensor case 20 contains a resin material. For example, heat is applied to the protrusion wall 25 that is fabricated so as to have an angle perpendicular to the shielding part body 230, to adjust the protrusion direction of the protrusion wall 25 toward the inside of the hood 22.

Other than the above description, the configurations described in the above-described embodiment may be selected or appropriately modified without departing from the scope of the present invention.

The infrared temperature sensor according to the present invention may be used as a so-called high-cut sensor that is used to urgently stop the operation of the toner fixer 1 when the temperature of the detection object, for example, the temperature of the roller 2 is excessively raised.

Figure 8A:
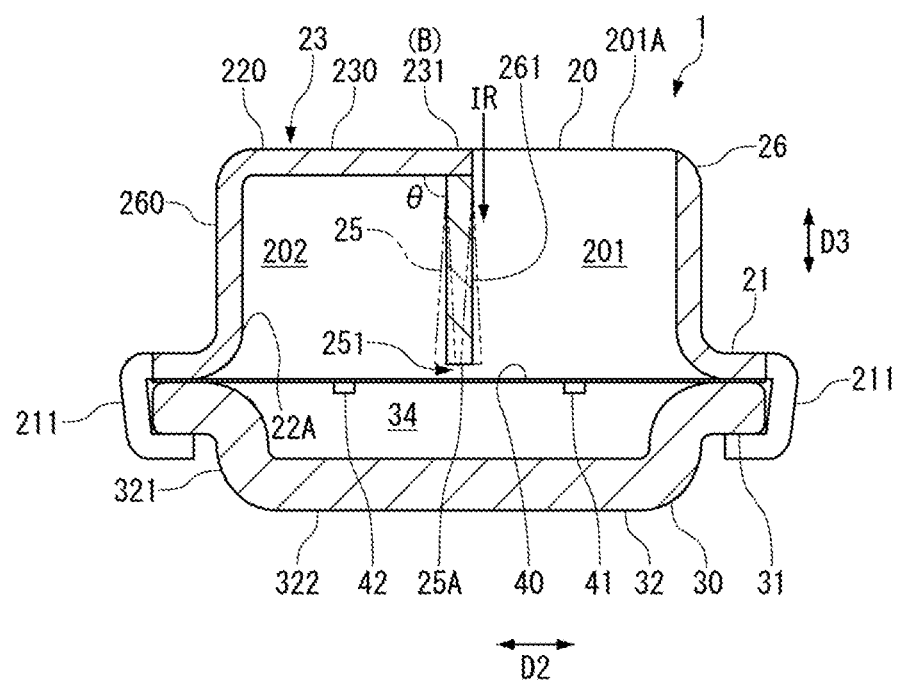
FIGS. 8A and 8B are cross-sectional views each illustrating an infrared temperature sensor according to a modification of the present invention.

The hood 22 according to the above-described embodiment is integrally formed with the protrusion wall 25 communicating with the shielding part body 230, whereas a hood 26 illustrated in FIG. 8A according to a modification of the present invention includes a hood body 260 and a protrusion wall 261 as a body separated from the hood body 260.

The hood body 260 includes the side wall 24 that surrounds the light guiding region 201 and the light shielded region 202, the shielding part body 230, and the opening part 201A.

The protrusion wall 261 is attached near the end edge 231 (boundary B) of the shielding part body 230 of the hood body 260 with an adhesive or the like. The protrusion wall 261 may be formed in a flat plate shape with use of a metal material or a resin material.

The protrusion wall 261 also protrudes from the boundary B toward the inside of the hood body 260 while being cantilever-supported by the shielding part body 230, and partitions the light guiding region 201 and the light shielded region 202, as with the protrusion wall 25 (FIG. 2) according to the above-described embodiment.

The protrusion direction of the protrusion wall 261 illustrated in FIG. 8A toward the inside of the hood body 260 is also adjustable by, for example, bonding the protrusion wall 261 to the shielding part body 230 so as to be directed to a direction slightly inclined to the perpendicular direction D3. Further, as necessary, a top end part of the protrusion wall 261 is cut off such that a top end surface of the protrusion wall 261 is inclined to the thickness direction, which makes it possible to adjust an angle θ formed by the protrusion wall 261 with respect to the shielding part body 230 when the protrusion wall 261 is abutted on the vicinity of the end edge 231 of the shielding part body 230.

Figure 8B:
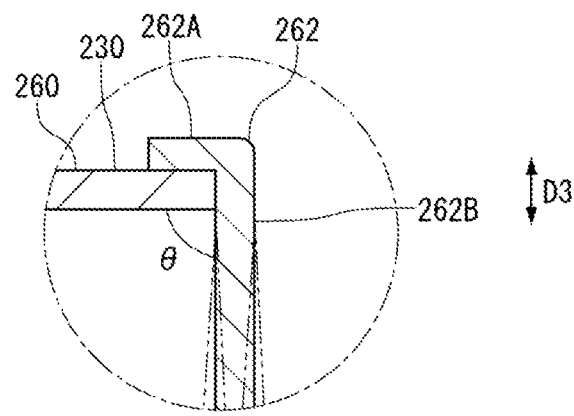

As illustrated in an example of FIG. 8B, a protrusion wall 262 as a body separated from the hood body 260 may be formed to have an L-shaped cross-section and be cantilever-supported by the shielding part body 230. The protrusion wall 262 includes an attachment part 262A that is attached to a top surface of the shielding part body 230 with an adhesive or the like, and a protrusion part 262B that is bent from the attachment part 262A and protrudes toward the inside of the hood body 260. The bending angle θ of the protrusion part 262B to the perpendicular direction D3 is adjustable.

In the embodiment and the modifications described above, the hood 22 of the sensor case 20 includes the shielding part 23 that includes the protrusion wall 25 protruding from the shielding part body 230, and the protrusion wall 25 protrudes from the boundary B between the opening part 201A and the shielding part body 230 toward the inside of the hood 22. In other words, the shielding part body 230 and the protrusion wall 25 are clearly distinguishable by the boundary B; however, the present invention also includes, in addition to such a form, forms as illustrated in FIGS. 9A and 9B.

Figure 9A:
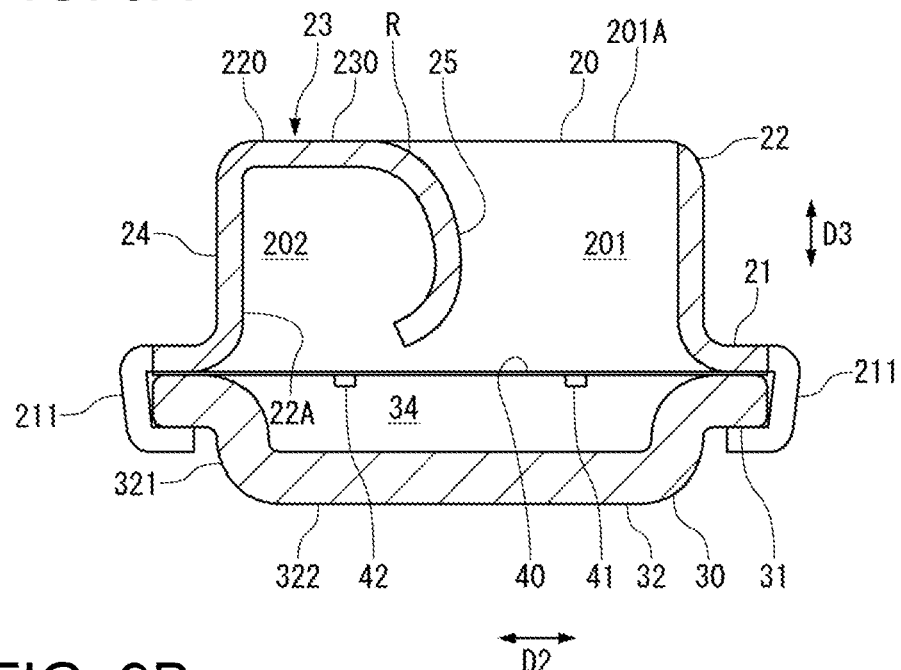
FIGS. 9A and 9B are cross-sectional views each illustrating an infrared temperature sensor according to a modification of the present invention.
Figure 9B:
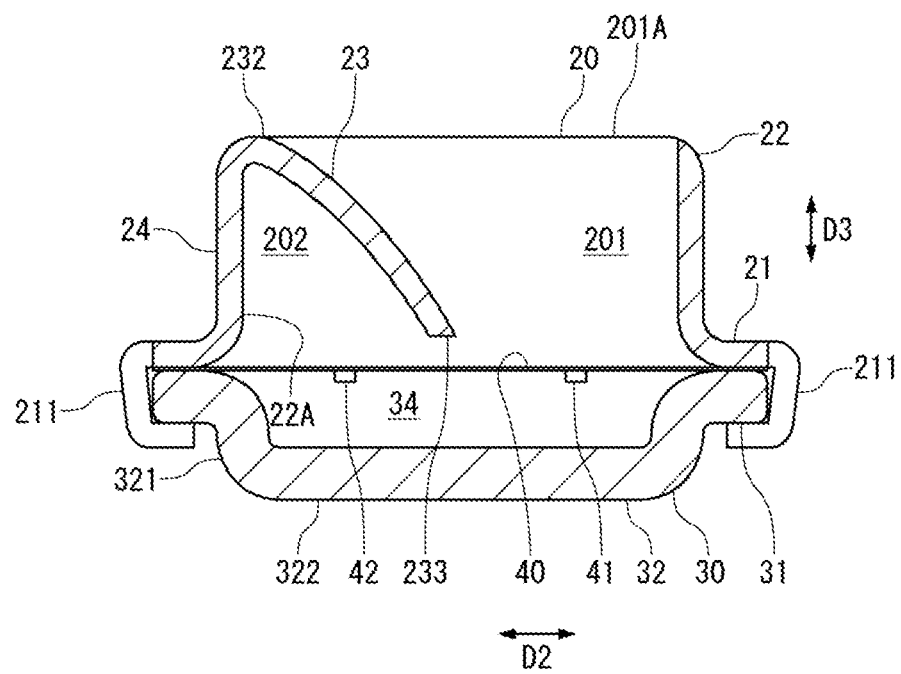

As illustrated in FIGS. 9A and 9B, the shielding part 23 is not necessarily clearly distinguished into the shielding part body 230 and the protrusion wall 25. In the above-described embodiment (FIG. 2), the boundary B between the opening part 201A and the shielding part body 230 also serves as the boundary between the shielding part body 230 and the protrusion wall 25, and the shielding part 23 is distinguishable into the shielding part body 230 and the protrusion wall 25 protruding from the boundary B. In contrast, in an example illustrated in FIG. 9A, the shielding part body 230 and the protrusion wall 25 are connected by a curved part R, and a position of the boundary between the opening part 201A and the shielding part body 230 and a base end of the protrusion wall 25 are not necessarily clear. In an example illustrated in FIG. 9B, the shielding part body 230 and the protrusion wall 25 are not distinguishable anymore in the shielding part 23. The shielding part 23 wholly extends from a base end part 232 supported at an upper end of the side wall 24 to a front end part 233 (free end) in proximity to the heat conversion film 40.

In any of FIGS. 9A and 9B, the shielding part 23 protrudes, as a whole, toward the inside of the hood 22 while partitioning the opening part 201A and the light guiding region 201, and shields the light shielded region from the infrared rays.

Also in the examples illustrated in FIGS. 9A and 9B, the output of the infrared temperature sensor 10 is correctable through adjustment of the protrusion direction of the entire shielding part 23 toward the inside of the hood 22, substantially similar to the case where the protrusion direction of the protrusion wall 25 in FIG. 2 is adjusted.

At this time, "adjustment of protrusion direction" of the shielding part 23 includes adjustment of a curvature of the protrusion wall 25 curved as illustrated in FIG. 9A, etc., in addition to adjustment of the attitude of the protrusion wall 25 relative to the shielding part body 230 in FIG. 9A and adjustment of the inclination angle of the shielding part 23 relative to the side wall 24 in FIG. 9B.

In the above-described embodiment, the infrared detection element 41 and the temperature compensation element 42 are disposed on the rear side of the film 40 that is irradiated with the infrared rays. In the present invention, however, the infrared detection element 41 and the temperature compensation element 42 may be disposed on the front side of the film 40.

The infrared detection element 41 and the temperature compensation element 42 are not necessarily strictly line-symmetric to each other about the boundary B between the light guiding region 201 and the light shielded region 202. The present invention also includes a configuration in which the infrared detection element 41 and the temperature compensation element 42 are slightly deviated from the positions line-symmetric about the boundary B as long as the desired detection accuracy is achievable.

Further, the light guiding region 201 and the light shielded region 202 are not necessarily strictly formed in the symmetric shapes. The present invention also includes a configuration in which the shapes and the dimensions of the light guiding region 201 and the light shielded region 202 are slightly different as long as the desired detection accuracy is achievable.

REFERENCE SIGNS LIST

1 Toner fixer
2 Roller (detection object)
10 Infrared temperature sensor
20 Sensor case
21 Case base portion
22 Hood
22A Opening
23 Shielding part
24 Side wall
25 Protrusion wall
25A End edge
30 Sensor cover
31 Cover base portion
31A Rear end
32 Element accommodating dome
33 Notch
34 Hollow portion
40 Heat conversion film
41 Infrared detection element
42 Temperature compensation element
45 Electric wire fixing region
60 Electric wire
70 Sensor case
71 Base portion
72 Light shielding dome
201 Light guiding region
201A Opening part
202 Light shielded region
211 Joining piece
220 Top portion
230 Shielding part body
231 End edge
251 Clearance
321 Side wall
322 Bottom floor
B Boundary
C Axis line
C1 Center line
D1 Longitudinal direction
D2 Width direction
D3 Perpendicular direction
IR Infrared rays
L Distance
H1 Height
W1 Dimension
θ Bending angle

What is claimed is:

1. An infrared temperature sensor that detects temperature of a detection object in a non-contact manner, the infrared temperature sensor comprising:
    a sensor case that includes an opening part, and is provided with a light guiding region guiding infrared rays entering from the opening part, and a light shielded region closed from surroundings and shielded from the infrared rays;
    a film that is disposed to face the light guiding region and the light shielded region and is configured to absorb the infrared rays reaching through the light guiding region and to convert the infrared rays into heat;
    a sensor cover that is disposed to face the sensor case through the film;
    an infrared detection element that is disposed at a part of the film corresponding to the light guiding region; and
    a temperature compensation element that is disposed at a part of the film corresponding to the light shielded region, wherein:
    the sensor case includes a base portion and a hood that surrounds the light guiding region and the light shielded region and is erected from the base portion,
    the hood includes the opening part and a shielding part that defines the opening part and the light guiding region,
    the shielding part includes:
        a shielding part body that defines the opening part and shields the light shielded region from the infrared rays,
        a protrusion wall that protrudes from a boundary between the opening part and the shielding part body toward the inside of the hood and partitions the light guiding region and the light shielded region, and
        a bending part that makes the protrusion wall freely inclinable with respect to a direction orthogonal to the film such that a protrusion direction of the protrusion wall is adjustable.

2. The infrared temperature sensor according to claim 1, wherein the protrusion wall is integrally formed with the shielding part body.

3. The infrared temperature sensor according to claim 1, wherein the protrusion wall is attached to the shielding part body.

4. The infrared temperature sensor according to claim 1, wherein
    the hood is formed in a rectangular shape long in a width direction in plan view, and
    the opening part and the shielding part are each formed in a rectangular shape to substantially bisect the hood in plan view.

5. The infrared temperature sensor according to claim 1, wherein the light guiding region and the light shielded region are formed in substantially symmetric shapes.

6. The infrared temperature sensor according to claim 1, wherein the protrusion wall is freely inclinable with respect to the direction orthogonal to the film such that an area of the film to which the infrared rays are applied is changeable.

7. The infrared temperature sensor according to claim 1, wherein the protrusion wall has an end edge away from the bending part, and a position of the end edge with respect to a surface of the film is changeable.

8. A method of manufacturing an infrared temperature sensor that detects temperature of a detection object in a non-contact manner, the method comprising:
    a step of fabricating a sensor case that is provided with a light guiding region guiding infrared rays entering from an opening part, and a light shielded region closed from surroundings and shielded from the infrared rays;

a step of preparing a film that faces the light guiding region and the light shielded region, absorbs the infrared rays reaching through the light guiding region and converts the infrared rays into heat, and includes an infrared detection element disposed at a part corresponding to the light guiding region and a temperature compensation element disposed at a part corresponding to the light shielded region;

a step of preparing a sensor cover that is disposed to face the sensor case through the film; and a step of assembling the sensor case and the sensor cover with the film in between, wherein in the step of fabricating the sensor case, a shielding part that protrudes toward an inside of a hood surrounding the light guiding region and the light shielded region while defining the opening part and the light guiding region and shields the light shielded region from the infrared rays, is formed by causing the hood to be erected from a base portion through press processing using a plate member containing a metal material, and stamping and bending of the plate member corresponding to the opening part.

9. The method of manufacturing the infrared temperature sensor according to claim 8, further comprising a step of adjusting a protrusion direction of the shielding part toward an inside of the hood.

10. An infrared temperature sensor that detects temperature of a detection object in a non-contact manner, the infrared temperature sensor comprising:

a sensor case that includes an opening part, and is provided with a light guiding region guiding infrared rays entering from the opening part, and a light shielded region closed from surroundings and shielded from the infrared rays;

a film that is disposed to face the light guiding region and the light shielded region and is configured to absorb the infrared rays reaching through the light guiding region and to convert the infrared rays into heat;

a sensor cover that is disposed to face the sensor case through the film;

an infrared detection element that is disposed at a part of the film corresponding to the light guiding region; and a temperature compensation element that is disposed at a part of the film corresponding to the light shielded region, wherein:

the sensor case includes a base portion and a hood that surrounds the light guiding region and the light shielded region and is erected from the base portion, the hood includes the opening part and a shielding part that protrudes toward an inside of the hood while defining the opening part and the light guiding region and shields the light shielded region from the infrared rays, and a position of an end edge of the shielding part close to a surface of the film is changeable such that a protrusion direction of the shielding part toward the inside of the hood is adjustable.

* * * * *